(12) United States Patent
Offenhaeuser et al.

(10) Patent No.: US 9,384,421 B2
(45) Date of Patent: Jul. 5, 2016

(54) METHOD FOR DETECTING THE DROWSINESS OF THE DRIVER IN A VEHICLE

(71) Applicants: Andreas Offenhaeuser, Marbach am Neckar (DE); Ernst Schermann, Leinfelden-Echerdingen (DE)

(72) Inventors: Andreas Offenhaeuser, Marbach am Neckar (DE); Ernst Schermann, Leinfelden-Echerdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/518,399

(22) Filed: Oct. 20, 2014

(65) Prior Publication Data

US 2015/0110402 A1 Apr. 23, 2015

(30) Foreign Application Priority Data

Oct. 18, 2013 (DE) .......................... 10 2013 221 188

(51) Int. Cl.
*G06K 9/00* (2006.01)
*G06K 9/40* (2006.01)
*G06K 9/62* (2006.01)
*G06T 7/00* (2006.01)

(52) U.S. Cl.
CPC .......... *G06K 9/6255* (2013.01); *G06K 9/00536* (2013.01); *G06T 7/00* (2013.01)

(58) Field of Classification Search
CPC .................. G06T 2207/10016; G06T 7/0083; G06T 7/0081; G06T 7/00; G06K 9/48; G06K 9/4609; G06K 9/6255
USPC ......... 382/100, 103, 104, 190, 155, 162, 168, 382/173, 181, 232, 254, 276, 309, 312, 298, 382/272, 274; 701/1, 400, 300, 301, 302; 348/113, 116, 117, 118
See application file for complete search history.

(56) References Cited

U.S. PATENT DOCUMENTS

| 6,243,015 | B1* | 6/2001 | Yeo ........................ G08B 21/06 340/575 |
| 7,202,792 | B2* | 4/2007 | Zhang .................... G08B 21/06 340/436 |
| 7,898,426 | B2* | 3/2011 | Rai .......................... A61B 5/18 340/573.1 |
| 8,519,853 | B2* | 8/2013 | Eskandarian ........ A61B 5/6887 180/272 |
| 8,631,893 | B2* | 1/2014 | Van Schoiack ....... B60W 40/08 180/272 |
| 2006/0106437 | A1* | 5/2006 | Czeisler ................ A61M 21/02 607/88 |
| 2010/0079294 | A1 | 4/2010 | Rai et al. |

FOREIGN PATENT DOCUMENTS

| DE | 69805955 | 2/2003 |
| DE | 10359125 | 7/2005 |

* cited by examiner

*Primary Examiner* — Sheela C Chawan
(74) *Attorney, Agent, or Firm* — Norton Rose Fulbright US LLP

(57) ABSTRACT

In a method for detecting the drowsiness of a driver in a vehicle, a course of a circadian curve is modified as a function of the environmental brightness.

9 Claims, 3 Drawing Sheets

METHOD FOR DETECTING THE DROWSINESS OF THE DRIVER IN A VEHICLE

FIELD OF THE INVENTION

The present invention relates to a method for detecting the drowsiness of the driver in a vehicle.

BACKGROUND INFORMATION

In German Patent No. 698 05 955 T2, a method is described for the drowsiness monitoring of a vehicle driver, in which the circadian rhythm, which characterizes the biological functioning of the driver in daytime rhythm, is ascertained, and a warning is output in case a certain state of drowsiness is detected. Since the biological functioning of persons is subject to a time-of-day rhythm, the current state of drowsiness according to German Patent No. 698 05 955 T2 is ascertained as a function of the clock time. In addition, individual deviations of the circadian curve from reference values are taken into account, which are ascertained by the use of sensors from the driving behavior, for instance, the steering operation of the driver.

In U.S. Published Patent Application No. 2010/0079294 A1, an attention detection system is described, in which the various biological rhythms of human beings is observed, in order to ascertain the current state of attentiveness. In this case, the circadian rhythm is also taken into account, which represents day and night influences, as well as the homeostatic rhythm for the effect of preceding sleeping and waking phases. In order to determine at which current point of the circadian rhythm one is located, sensor data of a light sensor are evaluated.

A method for detecting the reaction preparedness of a driver of a motor vehicle is known from German Published Patent Application No. 103 59 125 A1 which is based on the evaluation of the pupil reflexes. During driving, the pupil of the driver is monitored using a camera, and a conclusion is drawn on the degree of drowsiness of the driver from the pupil reflex.

SUMMARY

The present invention is based on the object of improving the travel safety in vehicles, using simple measures, by detecting the drowsiness of the driver.

The method according to the present invention is used for detecting the drowsiness of the driver in a vehicle. The method is based on the course of the circadian curve of the driver, which designates biological functioning in a time-of-day rhythm, that is, the biorhythm, and which is able to be drawn upon as an indicator of the drowsiness of the driver. In this connection, a high value in the course of the circadian curve corresponds to a high measure of drowsiness, and accordingly, a low value to a low value of drowsiness.

The course of the circadian curve depends on the time of day and the environmental brightness. Various biological functions, among others, the attentiveness, reach a maximum during the day and drop off to a minimum overnight. However, the actual course of the circadian curve is determined less by the current clock time than by the brightness, via which the sleeping rhythm and the natural drowsiness rhythm of a human being is affected.

In the method according to the present invention, in order to detect the drowsiness of the driver, a circadian reference curve is drawn upon, which is modified as a function of the environmental brightness. Consequently, the environmental brightness is not, or rather not only drawn upon to determine the current value in the circadian rhythm, but rather the magnitude of the circadian value depends on the environmental brightness. In the case of this dependence, the current course of the circadian curve drops compared to the reference curve with increasing environmental brightness and goes up compared to the reference curve with decreasing environmental brightness.

For example, the course of the current circadian curve is lowered with respect to the reference curve when the environmental brightness exceeds an upper brightness boundary value. In this case one may assume that a greater environmental brightness leads to a reduction in the drowsiness of the driver, and accordingly, the course of the circadian curve, which characterizes the drowsiness of the driver, is also reduced to a lower value.

Conversely, the current course of the circadian curve is raised compared to the reference curve if the environmental brightness falls below or lies below a brightness boundary value. In this case, based on the lower incident light from the outside, it is assumed that the watchfulness of the driver is reduced and that the drowsiness value is increased, which is reflected in a higher current course of the circadian curve with reference to the reference curve.

The biological day/night rhythm of the driver is portrayed more appropriately with the lowering and raising of the current course of the circadian curve with reference to the reference curve, as a function of the environmental brightness. By the measuring of the environmental brightness, seasonal fluctuations having shorter day phases in the winter and longer day phases in the summer may be taken into account, the same as different lengths of day at various geographical latitudes. The effects of brightness by the weather, such as by thick cloudiness or sunshine, are automatically also detected via the measurement of the environmental brightness. Consequently, it is not absolutely necessary to record seasons, geographical latitudes or weather effects in an explicit manner and to specify them in the course of the circadian curve. Accordingly, the method for detecting drowsiness is structured in a simple manner, and may be implemented in vehicles at relatively slight expenditure.

A presupposition for carrying out the method is the recording of the environmental brightness, which is preferably done using a light sensor in the vehicle. The light sensor is located, for example, on the rearview mirror in the vehicle and measures the quantity of light incident from the environment via the windshield. To distinguish only briefly occurring, high incidence of light, which is generated, for example, by the headlights of oncoming vehicles or road lights, the quantity of light measured in the light sensor may be submitted to filtering if necessary. Thereby a smoothing is achieved in the curve over time of the light quantity measured.

If necessary, one may also consider ascertaining the environmental brightness by an indirect measurement, for instance, by taking into account the outside temperature curve, and if necessary, taking into consideration the current time of day, in addition.

In the method, a circadian reference curve is drawn upon, and modified. The circadian reference curve may, for instance, be a median curve or an average curve from a plurality of previously ascertained circadian curves. However, it is also possible to use an individual circadian reference curve, which corresponds to the biorhythm of the respective driver, and originates, for example, with prior and perhaps continuing updated measurements of the driver's vital data, such as the pulse rate, breathing, skin temperature, etc.

In carrying out the method, one may draw upon the circadian reference curve, which reflects a 24-hour rhythm, and as a function of the current clock time, the corresponding value is taken from the reference curve. It is decided whether the value from the reference curve should be modified or be taken over without change by ascertaining the environmental brightness and the comparison with a brightness boundary value. If the environmental brightness is greater than the associated brightness boundary value, this basically has the effect of bringing about a higher attentiveness and a lower drowsiness of the driver, whereupon the current course of the circadian curve is lowered compared to the value of the reference curve. On the other hand, if the brightness determination yields that the environmental brightness is below an associated brightness boundary value, the current course of the circadian curve is raised compared to the value from the reference curve.

The current value of the course of the circadian curve may be used either in an assembly in the vehicle or a driver assistance system, in order to affect the parameterization of the assembly or the driver assistance system. The output of a warning message in the vehicle is also a possibility when the current course of the circadian curve, that characterizes the drowsiness, exceeds a boundary value, based on the increase over the reference curve, and thus points to an increased drowsiness. To the extent an intervention is made in the parameterization of an assembly or a driver assistance system, interventions, for example, in the steering of the vehicle, the braking system or interventions in the engine come into consideration, or affecting an electronic stability program (ESP), a braking assistant, a steering assistant or another driver assistance system. The current value from the course of the circadian curve influences the parameterization, whereby in the case of a greater drowsiness, the threshold values or the boundary values in an assistance system may be shifted in the direction of an earlier intervention that increases safety, for example.

Two different brightness values of different magnitude are advantageously taken into account, the drop in the current course of the circadian curve (lower drowsiness level) taking place if the environmental brightness exceeds an upper brightness boundary value, and the increase in the current course of the circadian curve (higher drowsiness level) taking place if the environmental brightness is below the lower brightness boundary value.

The drop in the current course of the circadian curve, in response to the exceeding of the associated brightness boundary value, advantageously takes place upon a value which lies between the minimum and the maximum of the reference curve. The increase and the decrease in the current course of the circadian curve preferably takes place in such a way that the raised value lies at a higher level than the dropped value. Furthermore, both a constant continuation of the raised or the dropping value come into consideration as well as a dropping and a raising of an inconstant value, which is ascertained from the reference curve as a function of the environmental brightness.

For example, upon the exceeding of an upper brightness boundary value, the current course of the circadian curve is reduced to a lowered, constant level, which is maintained until the reference curve also drops below this constant level. Thereupon, the current course of the circadian curve also again follows the reference curve.

Conversely, in response to a rising reference curve, the current course of the circadian curve is limited to the constant value until a sufficiently high environmental brightness prevails. Only when the environmental brightness drops below the boundary value does the current course of the circadian curve also rise again and preferably follows the reference curve.

The different brightness boundary values correspond to the day and night rhythm. The upper brightness boundary value is associated with day, and the lower brightness boundary value with night. The upper brightness boundary value becomes applied at an early brightness increase, that is, usually in summer, when the environmental brightness becomes greater than the upper brightness boundary value. In this case, one may assume a reduced drowsiness of the driver, which leads to a corresponding dropping of the current course of the circadian curve.

As long as the lower brightness boundary value, associated with the winter situation, which lies below the brightness boundary value associated with the summer situation, has not yet been exceeded, the current course of the circadian curve is raised compared to the reference curve, in order to signal an increased drowsiness. The lower brightness boundary value becomes useful at a later brightness increase, that is, usually in winter.

No manual or automatic repositioning between the different brightness boundary values is required. Rather, both a summer situation and a winter situation may automatically be detected in response to an appropriate design of the method sequence. In this connection, it is checked whether the environmental brightness first exceeds the upper brightness boundary value or lies below the lower brightness boundary value. In the first case, the dropping of the current course of the circadian curve takes place, and in the second case, the raising of the current course of the circadian curve takes place.

The method for drowsiness detection runs in a closed-loop or open-loop control unit in the vehicle, which may be a component of the driver assistance system.

DETAILED DESCRIPTION

Figure 1:
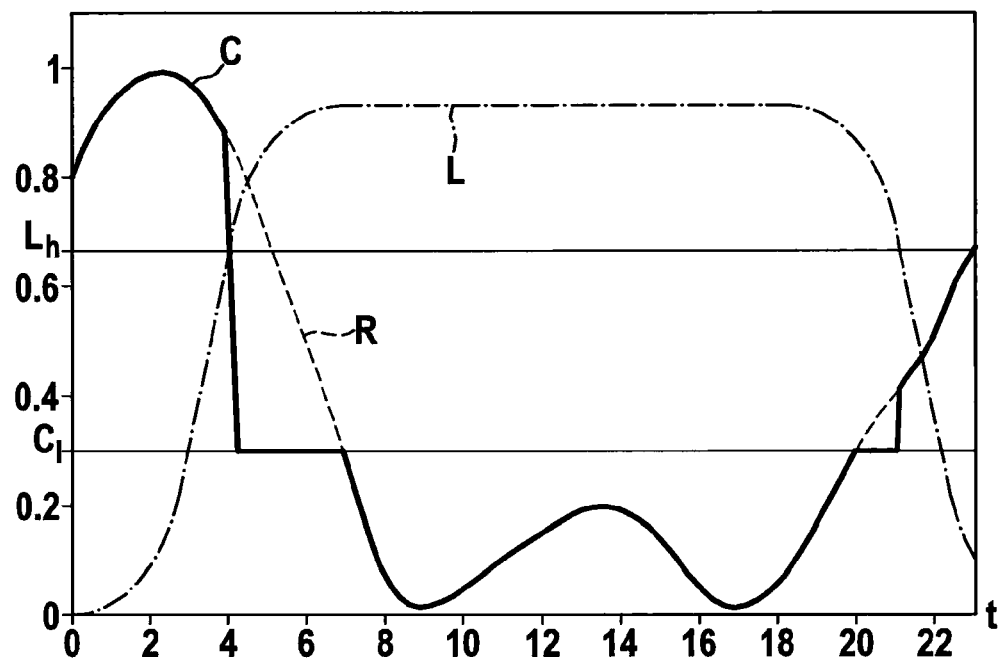
FIG. 1 shows a graphic representation having the current course of the circadian curve, an associated reference curve and the curve of the environmental brightness as a function of the time of day, shown for a summer situation.

FIG. 1 shows a graphic representation having a reference curve R of a circadian cycle, the current course of circadian curve C and the environmental brightness L as a function of the time of day, plotted over 24 hours. Reference curve R, to the extent that this curve deviates from the current course of circadian curve C, is shown using a dashed line. Current course of circadian curve C is shown using a solid line and brightness curve L using a dashed-dotted line.

In an exemplary manner, FIG. 1 represents a situation in a northern country in summer, where already at 2 a.m. the environmental brightness L rises sharply, and drops off only towards 9 o'clock in the evening. In the exemplary embodiment, an upper brightness boundary value $L_h$ is plotted, which is reached at about 4 a.m. by environmental brightness L, and below which environmental brightness L drops off towards approximately 9 p.m. Before upper brightness boundary value $L_h$ is reached, current course of circadian curve C follows reference curve R. Upon crossing upper brightness boundary value $L_h$ at 4 a.m., however, current course of circadian curve C drops abruptly to a lower constant value $C_I$. This corresponds to a drop in the drowsiness, which in reference curve R reaches its maximum at approximately 2 a.m., and towards 9 a.m. as well as 5 p.m. reaches respectively a minimum having maximum or minimum drowsiness. The dropping of current course of circadian curve C to lower constant value $C_I$ is carried out based on an assumed increased attentiveness and watchfulness as a result of the brighter environment.

The current course of circadian curve C keeps the lower constant value $C_I$ until about 7 a.m.; at this time, reference curve R falls below the value $C_I$. In the further course, current course of the circadian curve C coincides with reference curve R, and does this until about 8 p.m., and at this time, reference curve R exceeds the lower value $C_I$. Thereupon current course of circadian curve C is limited to constant value $C_I$ until, at 9 p.m., environmental brightness L drops below upper brightness boundary value $L_h$. After that, current course of circadian curve C coincides with reference curve R again.

Figure 2:
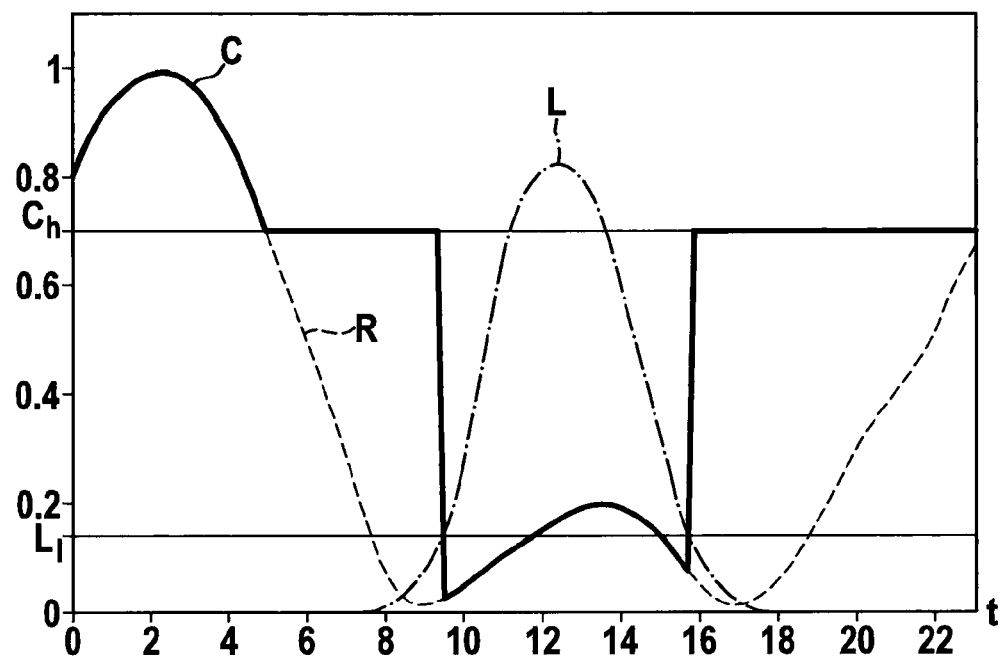
FIG. 2 shows a graphic representation corresponding to FIG. 1, for a winter situation.

FIG. 2 shows a winter situation in a northern country. Environmental brightness L begins to rise significantly only towards 9 a.m., and rapidly drops off already towards 4 p.m. A lower brightness boundary value $L_I$ is plotted; as long as environmental brightness L lies below lower brightness boundary value $L_I$, current course of circadian curve C is limited to an upper value $C_h$. As long as reference curve R still lies above constant value $C_h$, current course of circadian curve C coincides with reference curve R. Only after reference curve R drops below upper value $C_h$ towards 5 a.m. is current course of circadian curve C set to upper value $C_h$.

Current course of circadian curve C maintains this value until environmental brightness L crosses lower brightness boundary value $L_I$ towards 9.30 a.m.; at this time, current course of circadian curve C drops abruptly and follows reference curve R, until, about 4 p.m., environmental brightness L drops below lower brightness boundary value $L_I$ again, whereupon current course of circadian curve C is set to upper value $C_h$ again. Current course of circadian curve C maintains this upper value $C_h$ until reference curve R exceeds upper value $C_h$, and thereafter current course of circadian curve C follows reference curve R again.

Figure 3:
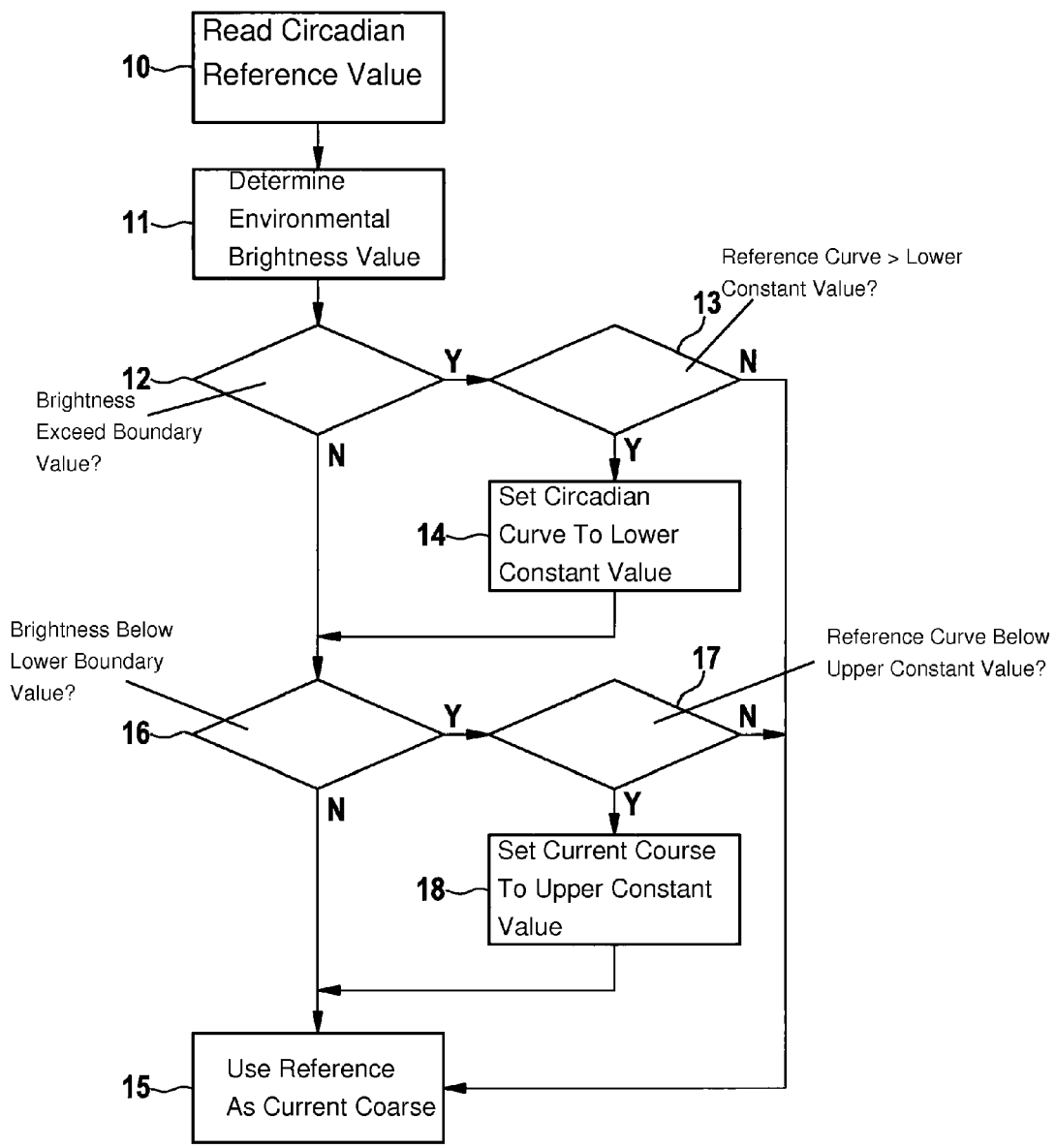
FIG. 3 shows a flow chart for ascertaining the current course of the circadian curve as a function of the environmental brightness.

FIG. 3 shows a flow chart for detecting the drowsiness of the driver under various conditions, which detect both a summer situation and a winter situation. In first method step 10, the circadian reference value is read from reference curve R as a function of the current clock time according to the vehicle electrical system in the vehicle. In next method step 11, environmental brightness L is determined via a light sensor in the vehicle.

The following method steps 12 through 14 correspond to the summer situation according to FIG. 1. In step 12 there is first the query as to whether the environmental brightness L exceeds upper brightness boundary value $L_I$. If this applies (corresponds to time 4 a.m. in FIG. 1), following the yes-branching ("Y") the system continues to next method step 13, in which a query takes place as to whether reference curve R is greater than the lower constant value $C_I$. If this applies (time 4 a.m. to 7 a.m. in FIG. 1), the yes-branching is subsequently advanced to step 14 and current course of circadian curve C is set to lower constant value $C_I$. Otherwise, the no-branching ("N") is then advanced to method step 15, and the value of reference curve R is used as the value of current course of circadian curve C for the further method.

If the query in method step 12 yields that environmental brightness L does not lie above upper brightness boundary value $L_h$, the no-branching is subsequently advanced to method step 16; subsequently to step 14 the system is also advanced to method step 16. Step 16, together with steps 17 and 18, corresponds to the graphic representation as in FIG. 2. In step 16 there is first the query as to whether the environmental brightness L lies below lower brightness boundary value $L_I$. If so, the yes-branching subsequently proceeds to step 17, in which a query takes place as to whether reference curve R lies below an upper constant value $C_h$. If this is also the case, following the yes-branching, in step 18, the current course of circadian curve C is set to the upper, constant value $C_h$. Otherwise, the no-branching is moved following step 15, and current course of circadian curve C follows reference curve R (corresponds in FIG. 2 to the time period between 0 o'clock and about 5 a.m.

If the query in step 16 yields that environmental brightness L does not lie below lower brightness boundary value $L_I$ (corresponds to the time span approximately between 9.30 a.m. and 4 p.m.), subsequently to the no-branching, the system advances to step 15; subsequently to step 18, the system also advances to step 15. In step 15 it is determined, in turn, that current course of circadian curve C follows reference curve R.

The flow chart according to FIG. 3 is run through continuously, so that the dropping off of the environmental brightness L below the respectively associated boundary value Lh (FIG. 1) and L (FIG. 2) and the establishment thereupon taking place of the current course of circadian curve C to the respectively associated constant value $C_I$ (FIG. 1) and $C_h$ (FIG. 2) are recorded.

Figure 4:
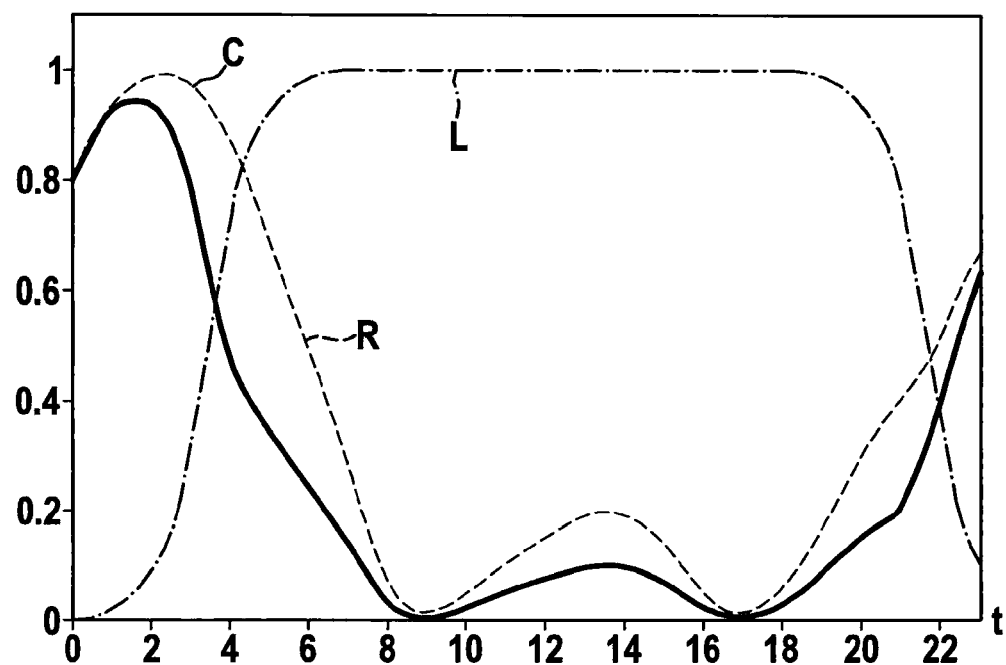
FIG. 4 shows a further graphic representation of an embodiment variant having the courses of the current circadian values, as well as the reference values and the brightness, shown for a summer situation.
Figure 5:
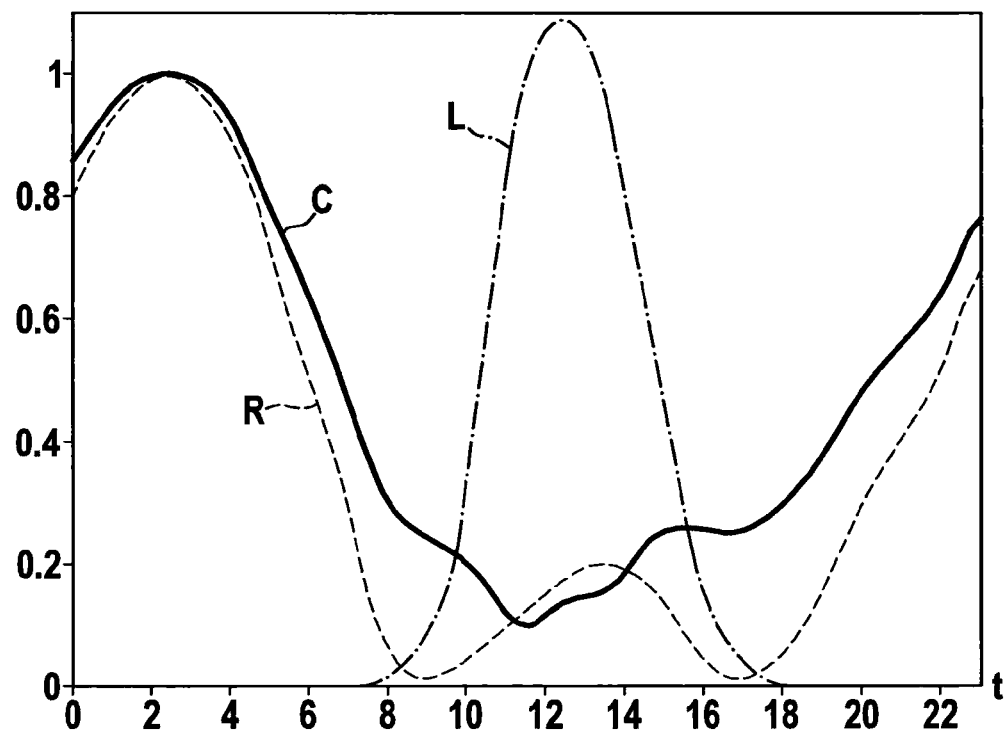
FIG. 5 shows a graphic representation corresponding to FIG. 4, shown for a winter situation. Identical curves are provided with the same labeling in the figures.

In FIGS. 1 and 2, current course of circadian curve C is set to a constant value if the environmental brightness exceeds or falls below a corresponding brightness boundary value. In FIGS. 4 and 5, an additional specific embodiment is shown, in which the current course of the circadian curve is shown as a function of environmental brightness L. For reasons of practicality, it may be advantageous, in this instance, to formulate the difference between current course of circadian curve C and associated reference curve R as a function of environmental brightness L.

Current course of circadian curve C or rather the difference from reference curve R may be in storage as a formula as a function of environmental brightness L. According to FIG. 4, which represents the brightness curve in a northern country in summer, current course of circadian curve C lies, in wide regions, below reference curve R. Only at a very low environmental brightness L do the curves for the current circadian values and the reference values coincide or at least nearly coincide. In the range of the minima, which represent the lowest drowsiness value, the curves also coincide approximately. The difference between curves C and R becomes apparent when environmental brightness L exceeds an associated boundary value. If, on the other hand, environmental brightness L lies below the boundary value, no difference, or at least no significant difference occurs between the courses of curves C and R.

FIG. 5 shows the situation in winter in a northern country having a curve of environmental brightness L that is correspondingly abbreviated in time. Current course of circadian curve C lies in wide regions above associated reference curve R. Only in the region of the maximum of environmental brightness L does current course of circadian curve C fall below reference curve R. Current course of circadian curve C is increased compared to reference curve R when environmental brightness L lies below an associated boundary value.

What is claimed is:

1. A method for ascertaining a drowsiness level of a driver in a vehicle, comprising:
    modifying, by a control unit of a driver assistance system having a processor, a predefined reference circadian curve characterizing a drowsiness level of the driver during a 24-hour period of a day, wherein the predefined reference circadian curve is modified as a function of an environmental brightness by (i) decreasing a current course of the circadian curve with respect to the reference circadian curve when an environmental brightness detected by a sensor exceeds a predefined brightness boundary value, and (ii) raising the current course of the circadian curve with respect to the reference circadian curve when the environmental brightness detected by the sensor lies below the predefined brightness boundary value; and
    ascertaining, by the control unit of the driver assistance system having the processor, the drowsiness level of the driver using the modified circadian curve for a specific point in time of the day.

2. The method as recited in claim 1, wherein at least one of an upper brightness boundary value and a lower brightness boundary value is used for the judgment as to whether the current course of the circadian curve is decreased or raised with respect to the reference circadian curve.

3. The method as recited in claim 2, wherein the current course of the circadian curve is set to a maximum value as long as the environmental brightness detected by the sensor lies below the lower brightness boundary value.

4. The method as recited in claim 1, wherein when the current course of the circadian curve exceeds the brightness boundary value, the current course is lowered to a first value that lies between a minimum and a maximum of the reference circadian curve.

5. The method as recited in claim 4, wherein the raising of the current course of the circadian curve in the case of the environmental brightness lying below the brightness boundary value takes place to a second value that lies above the first value.

6. The method as recited in claim 1, wherein the lowering or raising of the current course of the circadian curve takes place to a constant value.

7. The method as recited in claim 1, wherein the lowering or raising of the current course of the circadian curve takes place to an inconstant value, and wherein a deviation of the current course of the circadian curve from the reference curve is ascertained from the environmental brightness.

8. The method as recited in claim 1, wherein the driver assistance system includes one of an electronic stability program, a braking assistance system, or a steering system.

9. A device for a driver assistance system of a vehicle for detecting a drowsiness of a driver in the vehicle, comprising:
    a closed-loop or open-loop control device including a processor configured for:
        modifying a predefined reference circadian curve characterizing a drowsiness level of the driver during a 24-hour period of a day, wherein the predefined reference circadian curve is modified as a function of an environmental brightness by (i) decreasing a current course of the circadian curve with respect to the reference circadian curve when an environmental brightness detected by a sensor exceeds a predefined brightness boundary value, and (ii) raising the current course of the circadian curve with respect to the reference circadian curve when the environmental brightness detected by the sensor lies below the predefined brightness boundary value; and
        ascertaining the drowsiness level of the driver using the modified circadian curve for a specific point in time of the day.

* * * * *